United States Patent [19]
Koketsu

[11] Patent Number: 5,573,274
[45] Date of Patent: Nov. 12, 1996

[54] AUTOMOBILE SUB-FRAME STRUCTURE

[75] Inventor: Toshiaki Koketsu, Hamamatsu, Japan

[73] Assignee: Suzuki Motor Corporation, Japan

[21] Appl. No.: 361,051

[22] Filed: Dec. 21, 1994

[30] Foreign Application Priority Data

Dec. 24, 1993 [JP] Japan .................. 5-325673

[51] Int. Cl.[6] .................................. B62D 21/00
[52] U.S. Cl. .......................... 280/781; 180/297
[58] Field of Search ................... 280/781, 788; 180/291, 297, 299, 312; 296/194, 204

[56] References Cited

U.S. PATENT DOCUMENTS

| 4,240,517 | 12/1980 | Harlow, Jr. et al. | 180/299 |
|---|---|---|---|
| 4,406,343 | 9/1983 | Harasaki | 180/297 |
| 4,817,973 | 4/1989 | Takeda | 280/781 |
| 4,817,986 | 4/1989 | Kanazawa et al. | 280/781 |

FOREIGN PATENT DOCUMENTS

| 62-173376 | 7/1987 | Japan | 280/781 |
|---|---|---|---|
| 62-173375 | 7/1987 | Japan | 280/781 |
| 6-1259 | 1/1994 | Japan | 280/781 |
| 6-286641A | 10/1994 | Japan | 280/781 |

Primary Examiner—Brian L. Johnson
Assistant Examiner—Min Yu
Attorney, Agent, or Firm—Patterson & Streets, L.L.P.

[57] ABSTRACT

In an automobile sub-frame structure which is disposed on the lower surface of an engine room and has a pair of suspension lower arm support portions at each side, the automobile sub-frame structure includes arm brackets 14 which are joined between an upper member 11 and a lower member 12 to support a front arm of the suspension lower arm 10, and reinforcements 13 which are provided between the tip ends at sides of the upper member 11 and the lower member 12 to support the arm bracket 14 by overlapping with the arm bracket 14.

3 Claims, 8 Drawing Sheets

AUTOMOBILE SUB-FRAME STRUCTURE

FIELD OF THE INVENTION AND RELATED ART STATEMENT

The present invention relates to an automobile sub-frame structure which provides small-size components and increased rigidity.

In general, the body structure for a motor vehicle is broadly classified into a frame structure, which is mainly used for trucks, and a frameless structure, which is mainly used for passenger cars.

The frameless structure incorporates side members and cross members in the body as part of the body instead of a frame to increase torsional rigidity.

Chassis parts are attached directly to the body. For some vehicles, however, they are attached to a partial frame, what we call a sub-frame, and then assembled to the body.

FIGS. 10 to 13 show a lower body structure for a motor vehicle, in which a sub-frame is disposed on the lower surface of the engine room.

A sub-frame 100, which is arranged on the rear side of a front cross member 101, branches off in two at both ends to support a suspension lower arm 102.

Figure 10:
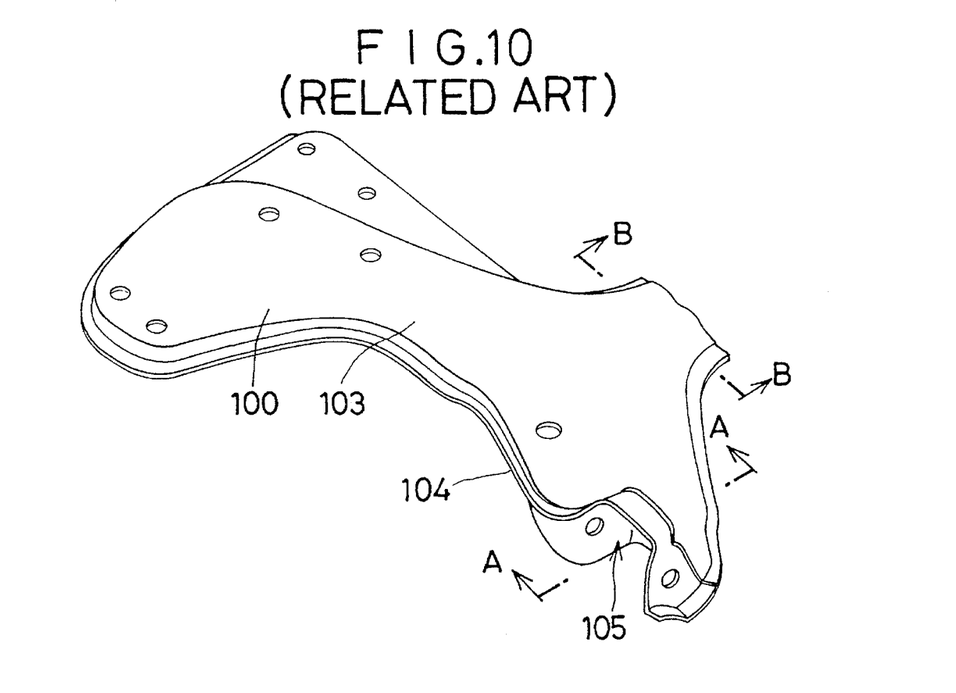
FIG. 10 is a perspective view showing a conventional sub-frame.
Figure 11:
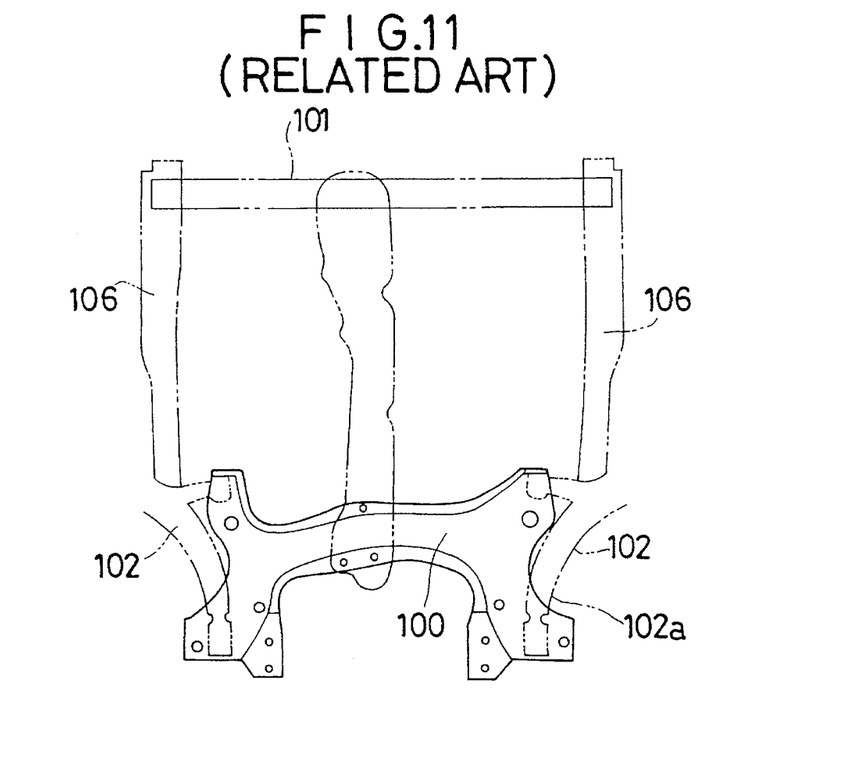
FIG. 11 is a plan view showing a conventional lower body structure of a motor vehicle.
Figure 12:
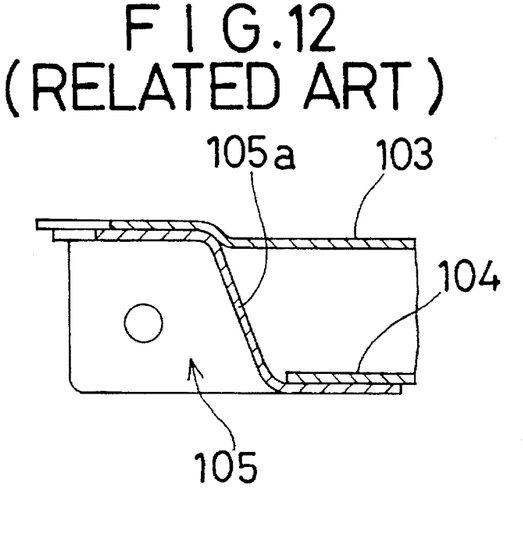
FIG. 12 is a sectional view taken along the line A—A of FIG. 10.
Figure 13:
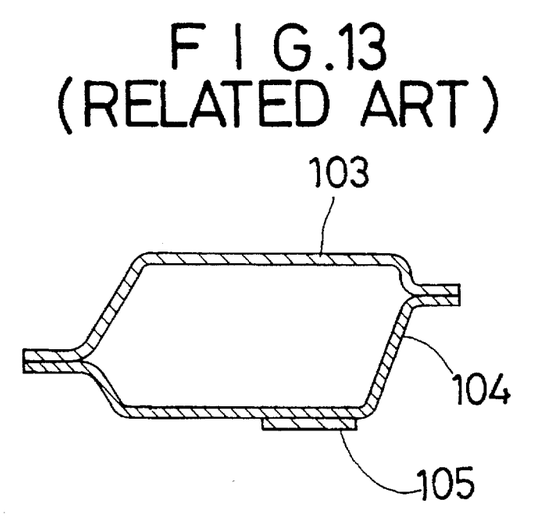
FIG. 13 is a sectional view taken along the line B—B of FIG. 10.

The sub-frame 100 consists of an upper member 103, a lower member 104, and arm brackets 105 supported between the upper member 103 and the lower member 104. In FIG. 11, reference numeral 106 denotes a front side member installed at each side of the vehicle.

The upper surface of the arm bracket 105 is joined to the lower surface of the upper member 103, while the lower surface thereof is joined to the lower member 104. The arm bracket 105 supports a front arm 102a of the suspension lower arm 102.

However, according to the above-described prior art, the upper member 103 extends to the front and is fixed to the upper wall of the arm bracket 105 so as to cover it to support the arm bracket 105.

Also, the lower surface of the arm bracket 105 extends and is lapped over and fixed to the lower member 104 so that a force from the arm bracket 105 is transmitted to the upper member 103 and the lower member 104.

Therefore, there is a disadvantage that both of the upper member 103 and the arm bracket 105 are large.

A large size of the upper member 103 and the arm bracket 105 requires many plate materials and is disadvantageous in manufacturing a mold.

Also, the rear side wall 105a of the arm bracket is subjected to a high force from the lower arm 102; therefore, the rear side wall 105a, which is formed by a single sheet, has a possibility of being deformed.

OBJECT AND SUMMARY OF THE INVENTION

An object of the present invention is to solve the above problems and to provide an automobile sub-frame structure for miniaturizing the components of the sub-frame for supporting a suspension lower arm and for increasing the rigidity.

To solve the above problems, according to the present invention, in an automobile sub-frame structure which is disposed on the lower surface of an engine room and has a pair of suspension lower arm support portions at each side, the automobile sub-frame structure includes arm brackets which are joined between an upper member and a lower member to support a front arm of the suspension lower arm, and reinforcements which are provided between the tip ends at sides of the upper member and the lower member to support the arm bracket by overlapping with the arm bracket.

As described above, the sub-frame is formed by an upper member, a lower member, and arm brackets which are supported between the ends of the upper member and the lower member, and reinforcements for supporting the arm bracket are mounted between the ends of the upper member and the lower member. Therefore, the joint portion between the upper member and the arm bracket can be decreased and there is no need for extending the lower surface of the arm bracket with respect to the lower member. Further, since a reinforcement is provided by overlapping with the rear wall of the arm bracket, the rigidity of the sub-frame is increased.

The automobile sub-frame in accordance with the present invention offers the effects described below.

In an automobile sub-frame structure which is disposed on the lower surface of an engine room and has a pair of suspension lower arm support portions at each side, the automobile sub-frame structure includes arm brackets which are joined between an upper member and a lower member to support a front arm of the suspension lower arm, and reinforcements which are provided between the tip ends at sides of the upper member and the lower member to support the arm bracket by overlapping with the arm bracket. Therefore, since the arm bracket is supported by the reinforcement, the upper member can be made small, so that the yield of material is increased, and the mold for manufacture can also be made small. Since the bracket rear wall, which is subjected to a high force, is supported by the reinforcement, the deformation of the arm bracket is reduced, and the stresses can be distributed smoothly.

Also, in an automobile sub-frame structure which is disposed on the lower surface of an engine room and has a pair of suspension lower arm support portions at each side, the automobile sub-frame structure includes arm brackets which are joined between an upper member and a lower member so that part of the tip end portion of the upper member overlaps with the upper surface of the arm bracket and the tip end of the lower member abuts against the side surface of the arm bracket, to support a front arm of the suspension lower arm, and reinforcements which are overlapped with and fixed to the side surface of the arm bracket and joined between the upper member and the lower member. Therefore, the upper member can be made small, so that the material can be saved, and the mold for manufacture can also be made small. Since the bracket rear wall, which is subjected to a high force, is supported by the reinforcement, the deformation of the arm bracket is reduced, and the stresses can be distributed smoothly. Also, since the arm bracket is fixed to the reinforcement, the joint surface between the arm bracket and the lower member can be decreased, by which the arm bracket can also be made small.

DETAILED DESCRIPTION OF PREFERRED EMBODIMENTS

One embodiment of the present invention will be described in detail below with reference to the drawings.

Figure 1:
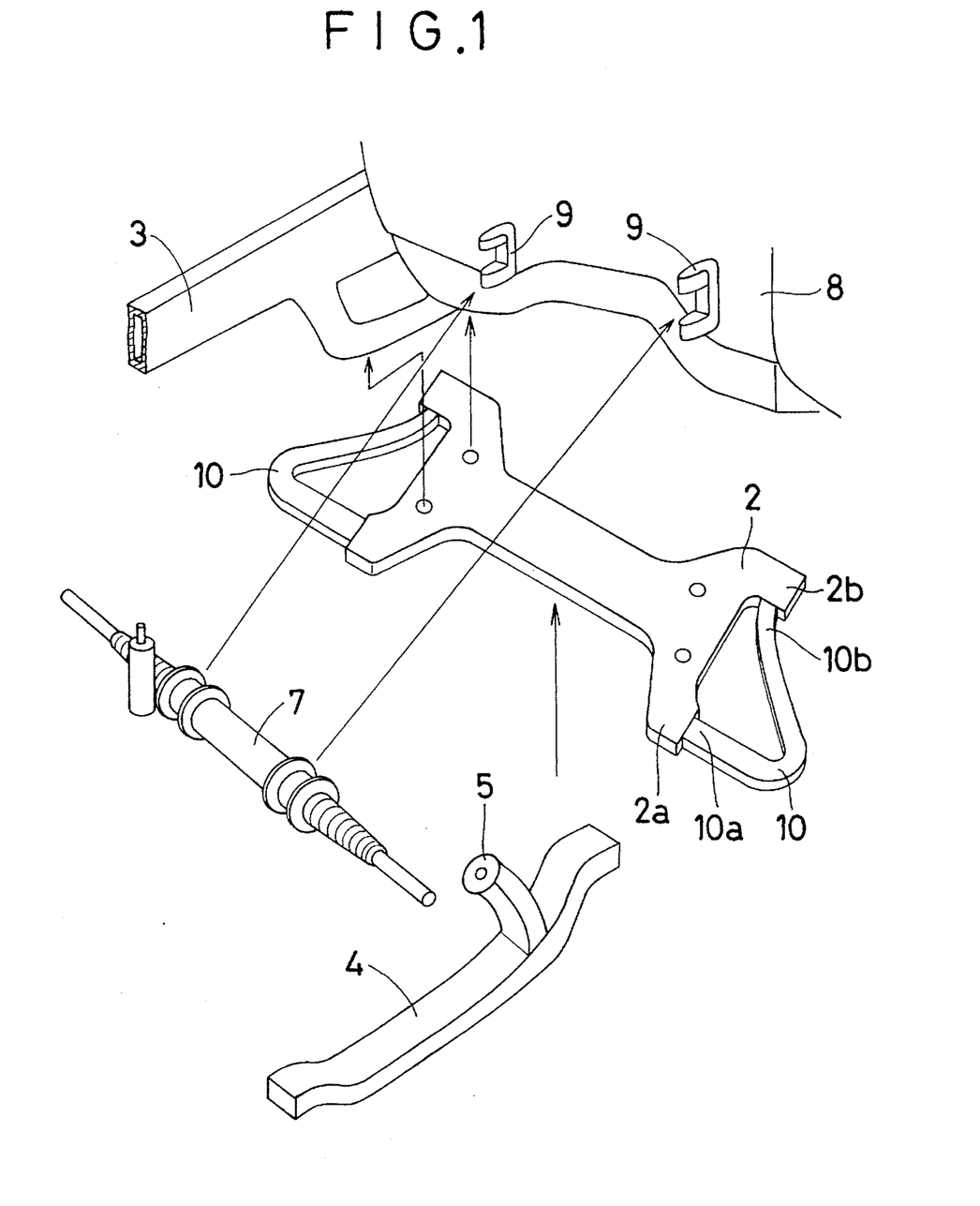
FIG. 1 is a perspective view showing one embodiment of an automobile sub-frame structure in accordance with the present invention.
Figure 2:
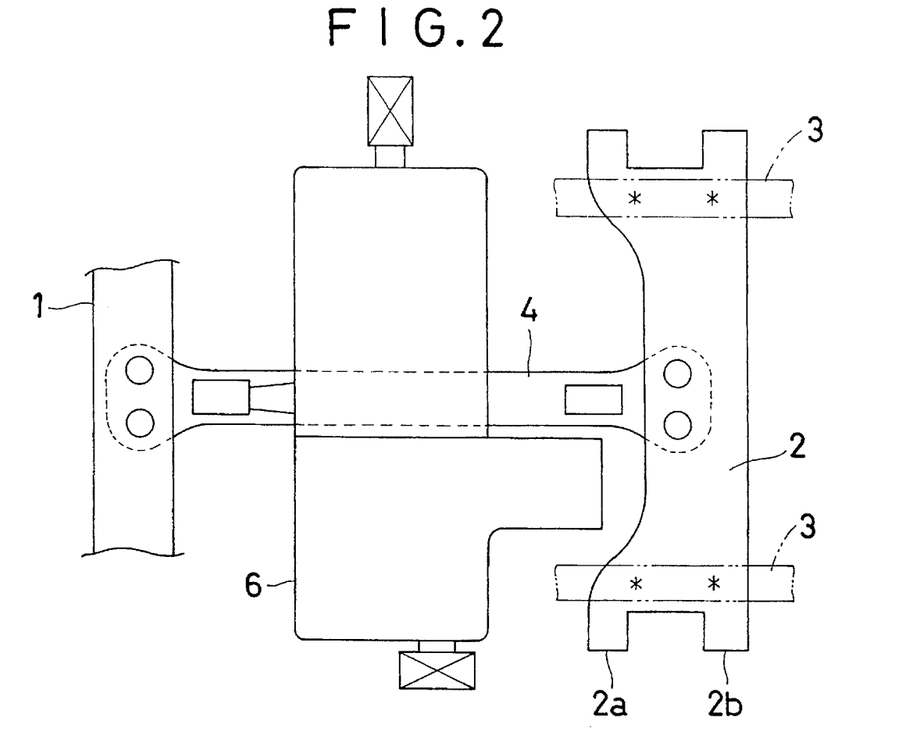
FIG. 2 is a plan view showing one embodiment of an automobile sub-frame structure in accordance with the present invention.
Figure 3:
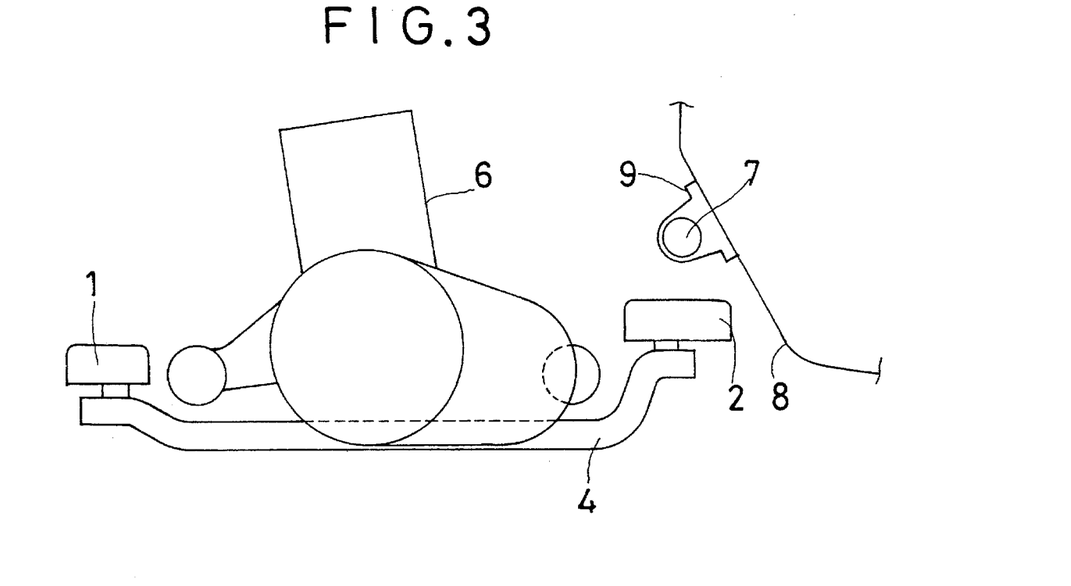
FIG. 3 is a side view of FIG. 2, in which a steering rack and a dashpanel are added.

FIGS. 1 to 3 show a lower body structure in an automobile engine room. In the figures, reference numeral 1 denotes a front cross member, and 2 denotes a sub-frame disposed at the rear of the front cross member 1. The sub-frame 2 is supported by front side members 3, 3 at both side portions by welding, and connected to the front cross member 1 via a center member 4.

The center member 4 is provided with an engine mount 5 to assemble, via the engine mount 5, an engine 6 disposed on the center member 4.

A steering rack 7 is supported by a rack mounting bracket 9 provided on a dashpanel 8.

The sub-frame 2 has a pair of lower arm support portions 2a, 2b at each end to support arms 10a and 10b of a suspension lower arm 10 via the lower arm support portions 2a and 2b, respectively.

Figure 6:
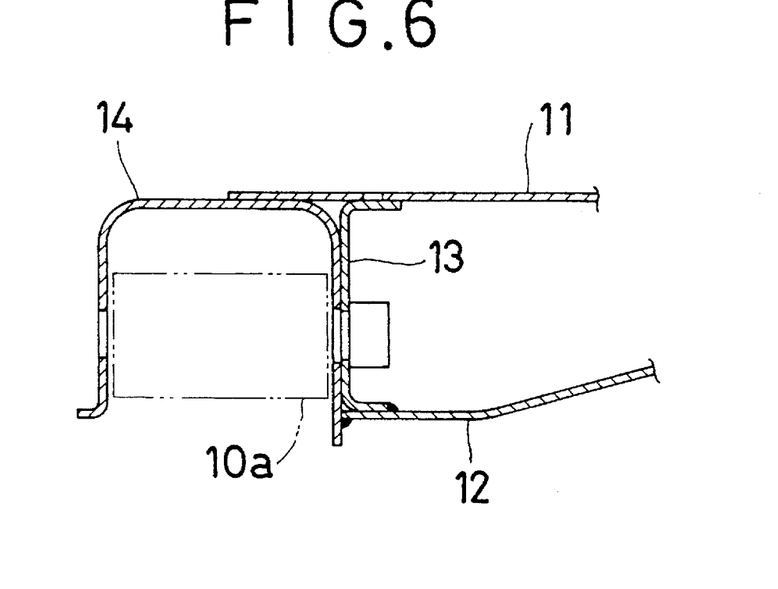
FIG. 6 is an enlarged sectional view taken along the line A—A of FIG. 5.
Figure 7:
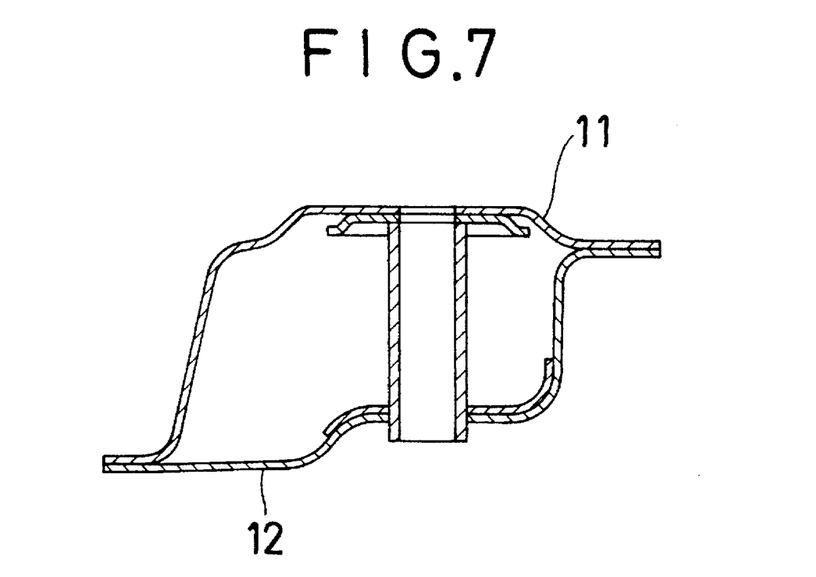
FIG. 7 is an enlarged sectional view taken along the line B—B of FIG. 5.
Figure 8:
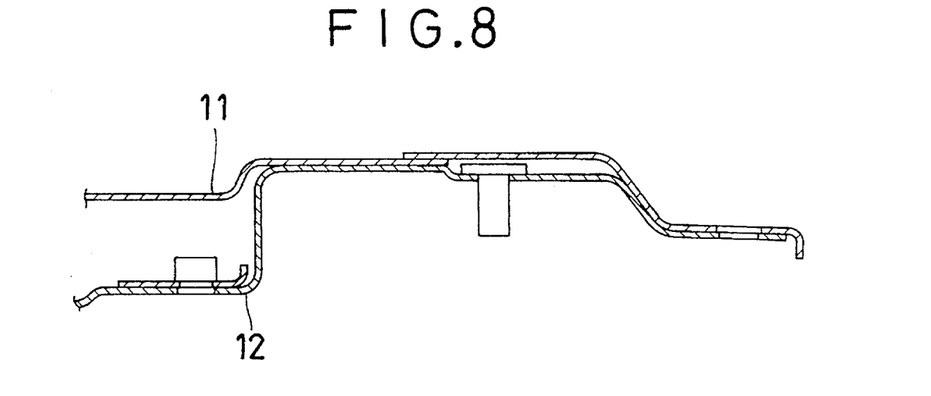
FIG. 8 is an enlarged sectional view taken along the line C—C of FIG. 5.
Figure 9:
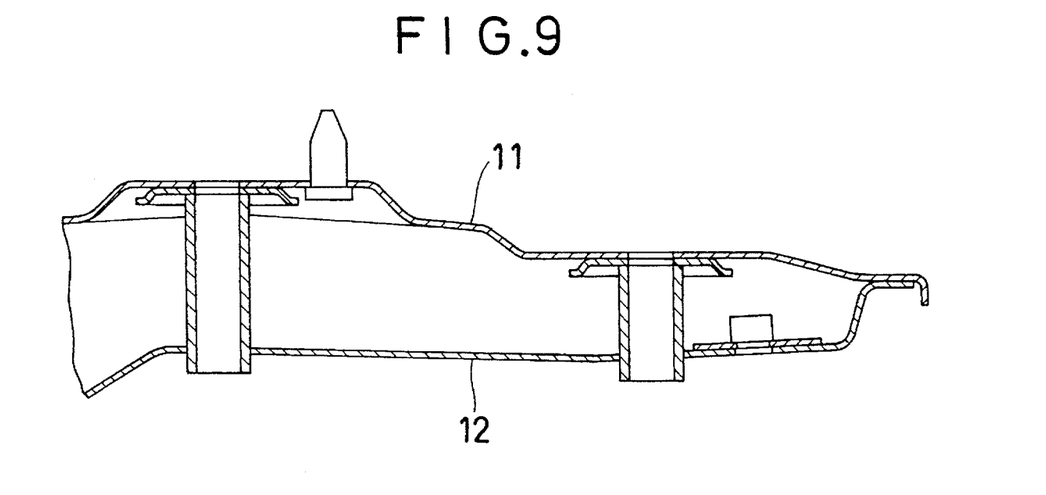
FIG. 9 is an enlarged sectional view taken along the line D—D of FIG. 5.

As shown in FIGS. 4 to 9, the sub-frame 2 is formed by a combination of an upper member 11 and a lower member 12, and a reinforcement 13, which is of a U shape in cross section, is joined between the tip ends of the upper member 11 and the lower member 12 (see FIG. 6).

A hat-shaped arm bracket 14, which is supported by the upper member 11 and the lower member 12, is joined to the lower arm support portion 2a on the front side of the sub-frame 2. This arm bracket 14 is joined so that the tip end portion of the upper member 11 laps partially over the upper surface of the arm bracket 14. The tip end of the lower member 12 is joined so as to abut against the side surface of the arm bracket 14. The side surface of the arm bracket 14 is lapped on and fixed to the reinforcement 13 by means of welding etc. (see FIGS. 4 and 6).

Figure 4:
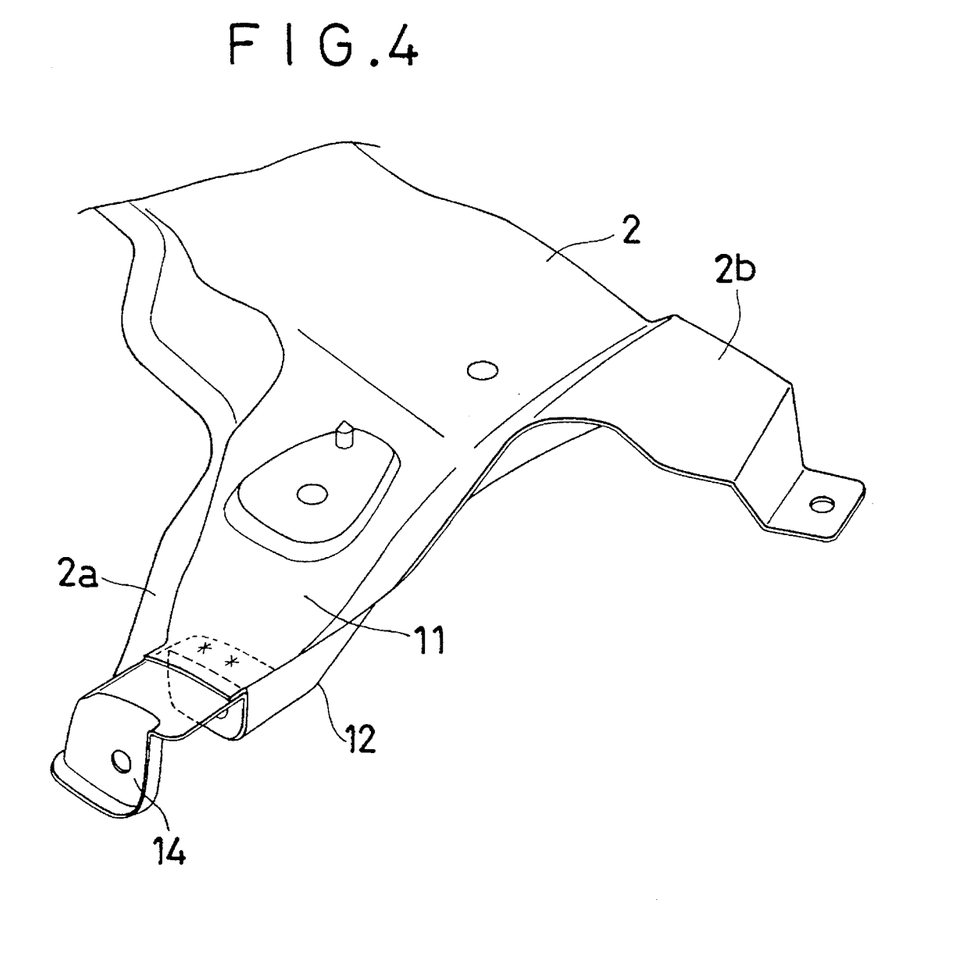
FIG. 4 is a perspective view showing the principal portion of the sub-frame shown in FIG. 1.
Figure 5:
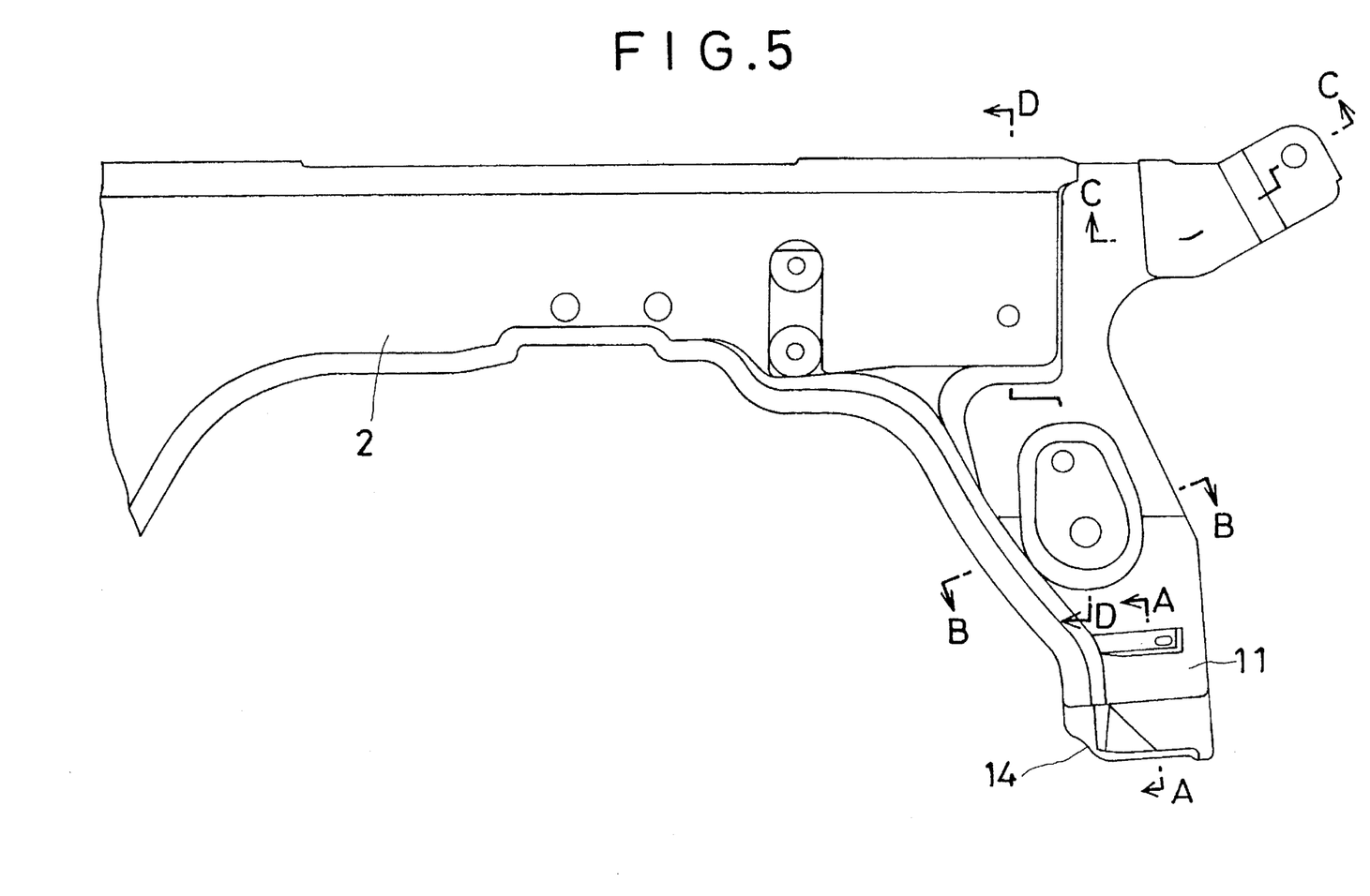
FIG. 5 is a plan view showing the principal portion of the sub-frame shown in FIG. 1.

According to the above configuration, the arm bracket 14 is not only supported by the upper member 11 and the lower member 12 but also supported by the reinforcement 13, so that sufficient rigidity can be achieved. Also, since the overlap portion of the upper member 11 with the arm bracket can be decreased, the upper member 11 can be made small. Further, since there is no need for overlapping of the arm bracket 14 with the lower member 12, the arm bracket 14 can also be made small.

What is claimed is:

1. An automobile sub-frame structure disposed on the lower surface of an engine room and having a pair of suspension lower arm support portions at both sides of said structure, which comprises an arm bracket of hat-shaped longitudinal cross-section having a pair of opposed lateral surfaces joined by an upper surface, said bracket arranged to support one of said suspension lower arm support portions, an upper member disposed to overlap part of the upper surface of said arm bracket, a lower member disposed in abutting contact with a first lateral surface of said arm bracket, and a reinforcement having a top joined to said insert member, and a bottom joined to said lower member, said reinforcement abutting against the first lateral surface of said arm bracket.

2. An automobile sub-frame structure disposed on the lower surface of an engine room and having a pair of suspension lower arm support portions at both sides of said structure, which comprises an arm bracket of hat-shaped longitudinal cross-section having a pair of opposed lateral surfaces joined by an upper surface, said bracket arranged to support one of said suspension lower arm support portions, an upper member having a pair of opposed ends, one of said ends overlapping part of said upper surface of said arm bracket, a lower member having a pair of opposed ends, one of which is in abutting contact with a first of said lateral surfaces of said arm bracket, and a C-shaped reinforcement disposed between the ends of said upper member and said lower member, said reinforcement having upper and lower flange portions, said flange portions directed inwardly and the first lateral surface of said arm bracket joined to and abutting against said reinforcement.

3. The structure of claim 2 wherein both of said flanges extend in the same direction parallel to said upper and lower members, said flanges being connected by a vertical member which is parallel to and abutting against said first lateral surface of said arm bracket, one of said flanges being connected to said upper member and the other of said flanges being connected to said lower member, said lower member abutting and being joined to said first lateral surface, and said upper member overlapping only part of said upper surface of said bracket, said bracket being U-shaped.

* * * * *